United States Patent
Read et al.

(10) Patent No.: US 11,781,432 B2
(45) Date of Patent: Oct. 10, 2023

(54) NESTED VANE ARRANGEMENT FOR GAS TURBINE ENGINE

(71) Applicant: RAYTHEON TECHNOLOGIES CORPORATION, Farmington, CT (US)

(72) Inventors: Kathryn S. Read, Marlborough, CT (US); Raymond Surace, Newington, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 17/385,271

(22) Filed: Jul. 26, 2021

(65) Prior Publication Data

US 2023/0026977 A1     Jan. 26, 2023

(51) Int. Cl.
*F01D 5/08*     (2006.01)
*F01D 5/28*     (2006.01)

(52) U.S. Cl.
CPC .............. *F01D 5/081* (2013.01); *F01D 5/282* (2013.01); *F01D 5/284* (2013.01); *F05D 2240/81* (2013.01); *F05D 2260/201* (2013.01); *F05D 2260/221* (2013.01); *F05D 2300/6033* (2013.01); *F05D 2300/6034* (2013.01)

(58) Field of Classification Search
CPC .......... F01D 5/081; F01D 5/282; F01D 5/284; F01D 11/005; F01D 9/041; F01D 5/188; F01D 5/189; F01D 9/065; F05D 2240/81; F05D 2260/201; F05D 2260/221; F05D 2300/6033; F05D 2300/6034
See application file for complete search history.

(56) References Cited

U.S. PATENT DOCUMENTS

| | | | |
|---|---|---|---|
| 3,529,903 A | 9/1970 | Scalzo et al. | |
| 4,655,682 A | 4/1987 | Kunz et al. | |
| 5,482,433 A | 1/1996 | Norris et al. | |
| 6,261,058 B1 * | 7/2001 | Kataoka | F01D 9/042 415/189 |
| 6,530,744 B2 | 3/2003 | Liotta et al. | |
| 6,595,747 B2 | 7/2003 | Bos | |
| 8,206,100 B2 | 6/2012 | Schuler et al. | |
| 10,036,263 B2 | 7/2018 | Lyders | |
| 10,202,857 B2 | 2/2019 | Simonds et al. | |
| 10,378,770 B2 | 8/2019 | Reynolds et al. | |

(Continued)

OTHER PUBLICATIONS

European Search Report for European Patent Application No. 22187073.6 dated Dec. 23, 2022.

*Primary Examiner* — Woody A Lee, Jr.
*Assistant Examiner* — Eric A Lange
(74) *Attorney, Agent, or Firm* — Carlson, Gaskey & Olds, P.C.

(57) ABSTRACT

An assembly for a gas turbine engine according to an example of the present disclosure includes at least one platform having a main body extending between a first mate face and a second mate face to establish a gas path surface. The main body has an internal passage extending circumferentially between a first opening along the first mate face and a second opening along the second mate face relative to an assembly axis. A perimeter of the first mate face establishes a first area, a perimeter of the second opening establishes a second area, and the second area is greater than the first area. An airfoil section extends radially from the at least one platform.

20 Claims, 9 Drawing Sheets

(56) References Cited

U.S. PATENT DOCUMENTS

| | | | |
|---|---|---|---|
| 10,822,973 B2 | 11/2020 | Parvis et al. | |
| 10,822,975 B2 | 11/2020 | Kline et al. | |
| 2010/0054932 A1 | 3/2010 | Schiavo | |
| 2016/0115800 A1* | 4/2016 | Lyders | F01D 9/02 |
| | | | 415/208.1 |
| 2016/0186583 A1* | 6/2016 | Alvanos | F01D 9/041 |
| | | | 156/308.2 |
| 2020/0072066 A1 | 3/2020 | Thomas et al. | |
| 2020/0080429 A1 | 3/2020 | Vetters et al. | |
| 2020/0149418 A1 | 5/2020 | Whittle et al. | |
| 2020/0348025 A1 | 11/2020 | Read et al. | |
| 2020/0362707 A1* | 11/2020 | Whittle | F01D 5/282 |
| 2020/0392049 A1* | 12/2020 | Razzell | C04B 41/87 |

\* cited by examiner

NESTED VANE ARRANGEMENT FOR GAS TURBINE ENGINE

BACKGROUND

This disclosure relates to gas turbine engines, and more particularly to techniques for bounding a flowpath through the engine.

Gas turbine engines typically include a compressor and a turbine. The engine may include a fan for propulsion. The air is compressed in the compressor. From the compressor the air is introduced into a combustor where it is mixed with fuel and ignited. Products of this combustion pass downstream through a gas path in the turbine. The turbine may include turbine blades that extract energy from the combustion products in the gas path for driving the compressor and fan. The turbine may include vanes that direct the combustion products through the gas path. The vanes may include platforms that bound the gas path.

SUMMARY

An assembly for a gas turbine engine according to an example of the present disclosure includes at least one platform having a main body extending between a first mate face and a second mate face to establish a gas path surface. The main body has an internal passage extending circumferentially between a first opening along the first mate face and a second opening along the second mate face relative to an assembly axis. A perimeter of the first mate face establishes a first area, a perimeter of the second opening establishes a second area, and the second area is greater than the first area. An airfoil section extends radially from the at least one platform relative to the assembly axis. The airfoil section has an internal cavity extending at least partially from the at least one platform. The airfoil section is integrally formed with the at least one platform. The airfoil section establishes an external surface contour. The airfoil section and the platform are established by a plurality of plies comprising a ceramic matrix composite (CMC) material.

In a further embodiment of any of the foregoing embodiments, the at least one platform includes a first platform, and the airfoil section extends radially inward from the first platform relative to the assembly axis.

In a further embodiment of any of the foregoing embodiments, the at least one platform includes a second platform, and the airfoil section extends radially outward from the second platform to the first platform relative to the assembly axis.

In a further embodiment of any of the foregoing embodiments, the gas path surface of the first platform faces the gas path surface of the second platform, a first distance is established between the gas path surface of the first platform and the gas path surface of the second platform at the first mate face, a second distance is established between the gas path surface of the first platform and the gas path surface of the second platform at the second mate face, and the first and second platforms are dimensioned such that the first distance differs from the second distance.

In a further embodiment of any of the foregoing embodiments, the plurality of plies include a first set of plies that follow a contour joining the at least one platform and the airfoil section.

In a further embodiment of any of the foregoing embodiments, the plurality of plies include a second set of plies that follow a perimeter of the internal passage. The plurality of plies include a third set of plies that extend from the airfoil section, through a sealing portion of the at least one platform, and into a mounting portion of the at least one platform.

In a further embodiment of any of the foregoing embodiments, the first mate face is insertable into an internal passage along a second mate face of an adjacent platform.

In a further embodiment of any of the foregoing embodiments, the at least one platform and the airfoil section cooperate to establish a fairing. A spar member has a spar body extending between a first end portion and a second end portion. The second end portion of the spar body is insertable at least partially through an opening of the at least one platform and into the internal cavity of the airfoil section, and the first end portion of the spar member is attachable to a static structure.

In a further embodiment of any of the foregoing embodiments, a baffle includes a baffle body extending between a first end portion and a second end portion. The baffle body includes an inner cavity dimensioned to convey cooling flow from a coolant source. The spar member includes a flange extending outwardly from the spar body at the first end portion, and the flange includes an opening at least partially aligned with an opening of the at least one platform. The second end portion of the baffle is insertable through the opening of the flange, through the opening of the at least one platform and into the internal cavity of the airfoil section.

In a further embodiment of any of the foregoing embodiments, the at least one platform includes a first platform and a second platform radially opposed to the first platform relative to the assembly axis, and the airfoil section extends radially between the first and second platforms relative to the assembly axis to interconnect the first and second platforms.

An assembly for a gas turbine engine according to an example of the present disclosure includes a plurality of vanes having a first vane and a second vane secured to the first vane. Each of the vanes include a first platform and a second platform radially opposed to the first platform. An airfoil section extends radially to join the first and second platforms. The airfoil section includes a ceramic material. Each of the first and second platforms includes a main body extending circumferentially between a first mate face and a second mate face. The main body includes first and second openings along the respective first and second mate faces. The first mate face of the first vane is received through the second opening of the second vane.

A further embodiment of any of the foregoing embodiments includes a plurality of spar members. Each of the spar members includes a spar body extending between a first end portion and a second end portion. The second end portion of the spar body is at least partially insertable through an opening of the first platform and an internal cavity of the airfoil section of the respective vane, and the first end portion of the spar member is attachable to a static structure to mount the respective vane.

A further embodiment of any of the foregoing embodiments includes a plurality of baffles. Each of the baffles has a baffle body extending between a first end portion and a second end portion. The baffle body includes an inner cavity dimensioned to convey cooling flow from a coolant source. Each of the spar members has a flange extending outwardly from the spar body at the first end portion, and the flange includes an opening at least partially aligned with the opening of the first platform of the respective vane. The second end portion of the baffle is insertable through the opening of the flange, through the opening of the first platform and into the internal cavity of the airfoil section of the respective vane.

In a further embodiment of any of the foregoing embodiments, the airfoil section is integrally formed with the first and second platforms. The airfoil section and the first and second platforms are established by a plurality of plies comprising a ceramic matrix composite (CMC) material.

A gas turbine engine according to an example of the present disclosure includes a compressor section having a compressor and a turbine section having a turbine coupled to the compressor. At least one of the compressor and turbine sections includes an array of blades rotatable about a longitudinal axis and an array of vanes adjacent to the array of blades. Each vane of the array of vanes includes a first platform and a second platform having gas path surfaces radially opposed relative to the longitudinal axis to bound a gas path, and an airfoil section extending radially to join the first and second platforms. The airfoil section includes a ceramic material. Each of the first and second platforms have a main body extending circumferentially between a first mate face and a second mate face to establish the respective gas path surfaces. The main body includes an internal passage extending circumferentially between first and second openings along the respective first and second mate faces. The first mate face of the first platform is insertable into the second opening along the second mate face of the first platform of an adjacent one of the vanes to establish the array of vanes.

In a further embodiment of any of the foregoing embodiments, the airfoil section is integrally formed with the first and second platforms. The airfoil body and the first and second platforms are established by a plurality of plies comprising a ceramic matrix composite (CMC) material.

In a further embodiment of any of the foregoing embodiments, the plurality of plies include a first set of plies and a second set of plies. The first set of plies follow a contour joining the first platform and the airfoil section. The second set of plies follow a perimeter of the internal passage of the first platform.

In a further embodiment of any of the foregoing embodiments, the first and second platforms and the airfoil section cooperate to establish a fairing, and further includes a plurality of spar members. Each of the spar members has a spar body extending between a first end portion and a second end portion. The second end portion of the spar body is insertable at least partially through an opening of the first platform of a respective one of the vanes and into an internal cavity of the respective airfoil section. The first end portion of the spar member is attachable to an engine static structure to secure the respective vane.

In a further embodiment of any of the foregoing embodiments, each of the first and second platforms establishes a first height along the first mate face and establishes a second height along the second opening of the second mate face, and each of the first and second platforms is dimensioned such that the first height is less than the second height.

A further embodiment of any of the foregoing embodiments includes a mount having a first mount portion and a second mount portion fixedly attached to the first mount portion to establish an annular channel. The annular channel is dimensioned to capture the first platform of each of the vanes to secure the vanes to an engine static structure.

The present disclosure may include any one or more of the individual features disclosed above and/or below alone or in any combination thereof.

The various features and advantages of this disclosure will become apparent to those skilled in the art from the following detailed description. The drawings that accompany the detailed description can be briefly described as follows.

BRIEF DESCRIPTION OF THE DRAWINGS

Like reference numbers and designations in the various drawings indicate like elements.

DETAILED DESCRIPTION

Figure 1:
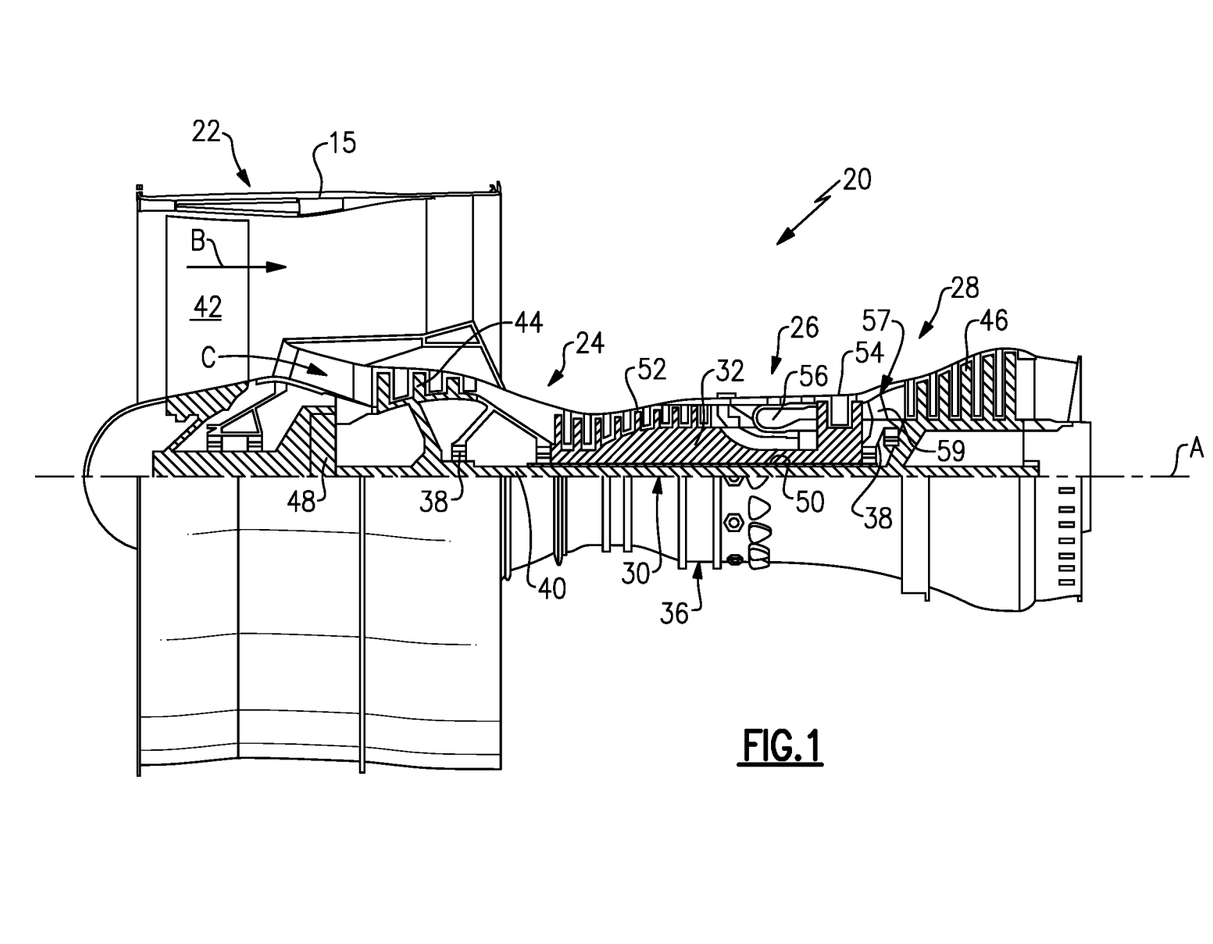
FIG. 1 schematically illustrates a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15 such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), and can be less than or equal to about 18.0, or more narrowly can be less than or equal to 16.0. The geared architecture 48 is an epicyclic gear train, such as a planetary gear system or other gear system, with a gear reduction ratio of greater than about 2.3. The gear reduction ratio may be less than or equal to 4.0. The low pressure turbine 46 has a pressure ratio that is greater than about five. The low pressure turbine pressure ratio can be less than or equal to 13.0, or more narrowly less than or equal to 12.0. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to an inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. The engine parameters described above and those in this paragraph are measured at this condition unless otherwise specified. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45, or more narrowly greater than or equal to 1.25. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150.0 ft/second (350.5 meters/second), and can be greater than or equal to 1000.0 ft/second (304.8 meters/second).

Figure 2:
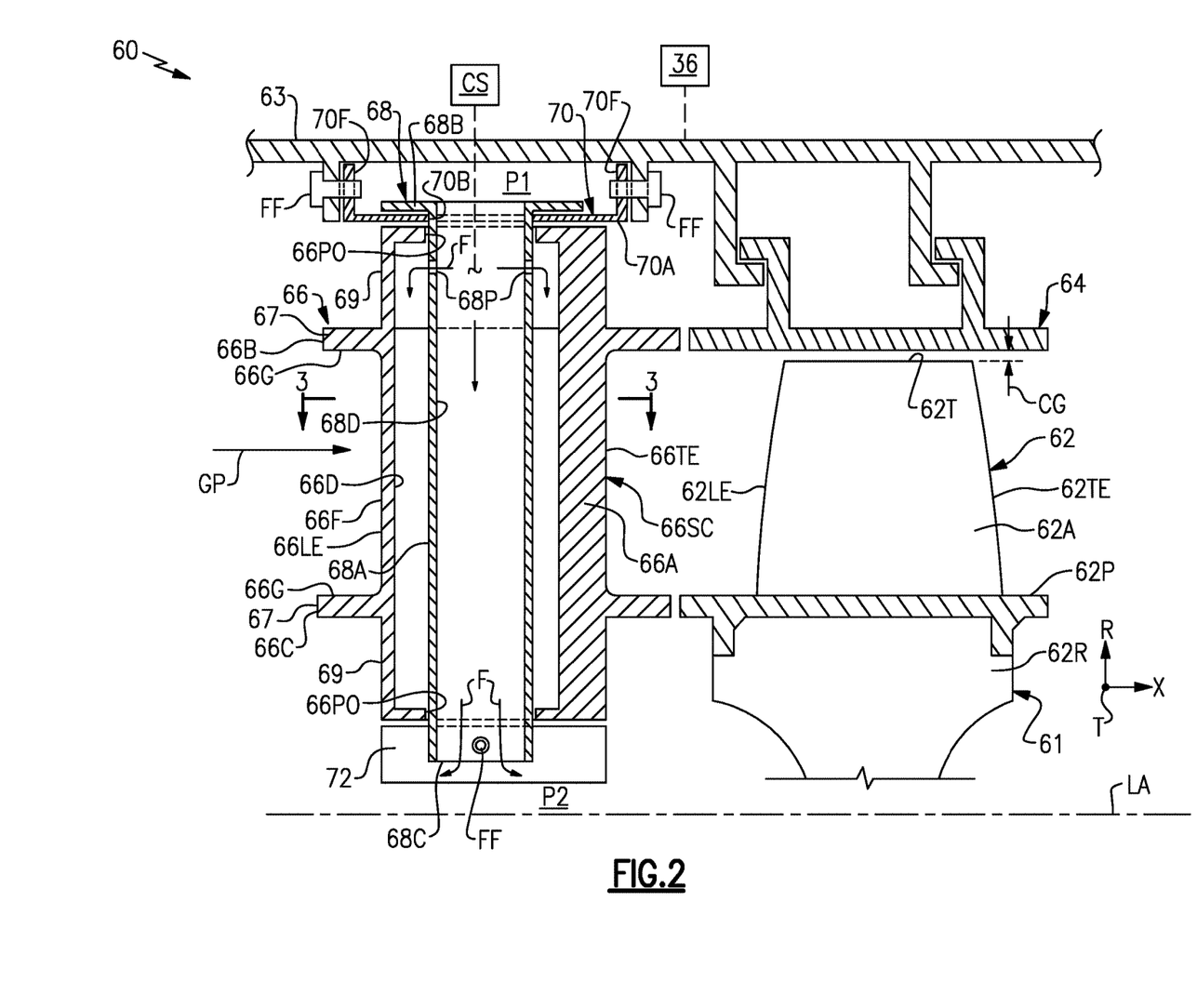
FIG. 2 illustrates a section of a gas turbine engine including a vane and a spar member.

FIG. 2 illustrates an exemplary section 60 for a gas turbine engine. The section 60 may be incorporated into the gas turbine engine 20 of FIG. 1, such as the compressor section 24 or turbine section 28. Other portions of the gas turbine engine 20 and other systems may benefit from the teachings disclosed herein, including combustor panels and liners in the combustion section 26, blade outer air seals and the mid-turbine frame 57 of the turbine section 28, and gas turbine engines lacking a fan for propulsion.

The section 60 can include at least one rotor 61 carrying one or more rotatable airfoils or blades 62. The blades 62 are rotatable about a longitudinal (or assembly) axis LA. The longitudinal axis LA can be collinear with or otherwise parallel to the engine axis A of FIG. 1.

Each blade 62 can include a platform section 62P and an airfoil section 62A extending in a radial or spanwise direction R from the platform section 62P to a tip 62T. The airfoil section 62A generally extends in a chordwise or axial direction X between a leading edge 62LE and a trailing edge 62TE. A root section 62R of the blade 62 can be mounted to, or can be integrally formed with, the rotor 61.

The section 60 can include at least one blade outer air seal (BOAS) 64. Each BOAS 64 can be spaced radially outward from the tip 62T of the blade 62 to establish a clearance gap CG. The BOAS 64 can include an array of seal arc segments that are circumferentially distributed or arranged in an annulus about an array of the blades 62 to bound a gas path GP. The gas path GP can be a portion of the core flow path C of FIG. 1, for example. The BOAS 64 can be mounted to a housing or case 63. The case 63 can be a portion of the engine static structure 36 (see FIG. 1). The case 63 can be dimensioned to extend about the assembly axis LA.

Figure 3:
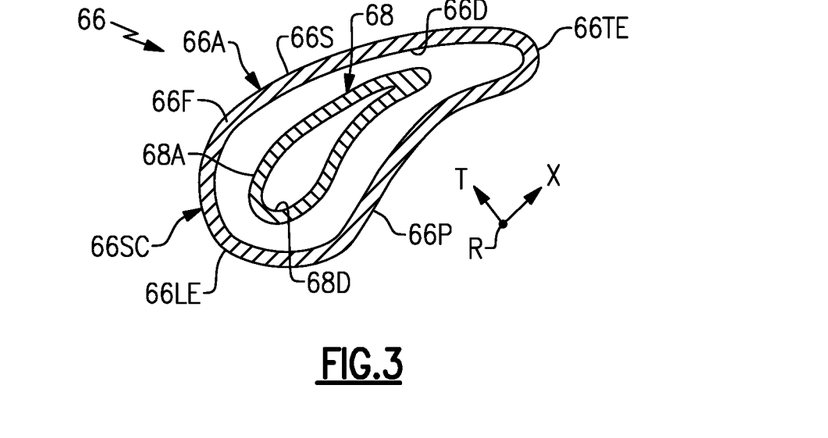
FIG. 3 illustrates a section of the vane taken along line 3-3 of FIG. 2.

The section 60 can include at least one airfoil or static vane 66 situated adjacent to the blade 62. The vane 66 can be a static turbine vane, and the blade 62 can be a rotatable turbine blade incorporated into the turbine section 28, for example. Each vane 66 can include an airfoil section 66A. The airfoil section 66A generally extends in the chordwise direction X between a leading edge 66LE and trailing edge 66TE. The airfoil section 66A generally extends in a circumferential or thickness direction T between pressure and suction sides 66P, 66S, as illustrated in FIG. 3. The pressure and suction sides 66P, 66S are joined at the leading and trailing edges 66LE, 66TE to establish an external surface contour 66SC. The airfoil section 66A can be arranged to direct or guide flow in the gas path GP from and/or towards the adjacent blade(s) 62. Although the vane 66 is illustrated having a single airfoil section (e.g., singlet), the vane may include two or more airfoil sections (e.g., doublet).

The vane 66 can include at least one platform, as illustrated by a first (e.g., outer) platform 66B and a second (e.g., inner) platform 66C. The platforms 66B, 66C are dimensioned to bound or define a portion of the gas path GP. The platforms 66B, 66C have gas path surfaces 66G that can be radially opposed to each other relative to the assembly axis LA to bound the gas path GP. Each platform 66B, 66C can include a sealing portion 67 and a mounting portion 69 extending radially outwardly from the sealing portion 67. The sealing portion 67 can extend axially from the mounting portion 69 and can establish the gas path surface 66G.

The airfoil section 66A of each vane 66 can extend in the radial direction R across the gas path GP between the platforms 66B, 66C to join and interconnect the platforms 66B, 66C. The airfoil section 66A can extend radially inward relative to the radial direction R from the first platform 66B relative to the assembly axis LA. The airfoil section 66A can extend radially outward from the second platform 66C to the first platform 66B relative to the assembly axis LA.

The section 60 can include at least one array of blades 62 and at least one array of vanes 66 adjacent to the array of blades 62. The section 60 can include at least one array of BOAS 64 arranged circumferentially about the assembly axis LA to surround the blades 62. The array of blades 62 are rotatable about the assembly axis LA. The array of vanes 66 are spaced axially from the array of blades 62 relative to the assembly axis LA. The tips 62T of the blades 62 and adjacent BOAS 64 are arranged in close radial proximity to reduce the amount of gas flow that may escape around the tips 62T through the corresponding clearance gap CG.

The airfoil section 66A and platforms 66B, 66C can cooperate to establish a fairing 66F. The airfoil section 66A can include an internal cavity 66D extending at least partially between the platforms 66B, 66C. The internal cavity 66D can be dimensioned to interconnect a platform opening 66PO of the first platform 66B and a platform opening 66PO of the second platform 66C.

Various techniques can be utilized to secure the vane 66. Each vane 66 can include at least one spar member 68 including a spar (or main) body 68A extending radially between a first end portion 68B and a second end portion 68C. The second end portion 68C of the spar body 68A can be at least partially insertable through the platform opening 66PO of the first platform 66B and into the internal cavity 66D of the airfoil section 66A. The first end portion 68B and/or second end portion 68C of the spar member 68 can be attachable to a static structure, such as the housing 63 or another portion of the engine static structure 36, to at least partially support the fairing 66F and mount or otherwise secure the respective vane 66.

The section 60 can include one or more mounts 70. Each mount 70 may include a main body 70A and one or more flanges 70F extending from the main body 70A. The flanges 70F may be secured to the housing 63 or another portion of the static structure 36 with one or more fasteners FF. The main body 70A may include an opening 70B dimensioned to at least partially receive the spar member 68. The first end portion 68B of the spar member 68 may be dimensioned to abut the main body 70A of the mount 70 such that the spar member 68 is at least partially supported by the mount 70. In other examples, the spar member 68 can be mounted directly to the case 63, and the mount 70 can be omitted.

The spar members 68 can be non-structural components or can be structural components dimensioned to support the respective fairings 66F and/or a portion of the section 60 radially inward of the vane 66 to establish a load path with the case 63 or static structure 36. The second end portion 68C of the spar member 68 can be fixedly attached or otherwise secured to an annular housing 72 with one or more fasteners FF. The housing 72 can be a full circumferential hoop or can include one or more segments fastened to the respective spar members 68. The housing 72 can be dimensioned to abut the fairing 66F to limit movement of fairing 66F relative to the assembly axis LA. The housing 72 can be utilized to interconnect an array of spar members 68. The housing 72 can be dimensioned to support one or more of the bearing systems 38 (FIG. 1). In other examples, the housing 72 can be omitted, and the spar member 68 can be cantilevered from the case 63.

The spar body 68A of each spar member 68 can be an elongated hollow strut or conduit dimensioned to convey fluid F such as coolant or lubricant to an adjacent portion of the section 60. Each spar member 68 can include an inner cavity 68D dimensioned to convey the fluid F. The inner cavity 68D can be dimensioned to extend radially through a thickness of the spar body 68A between the first and second end portions 68B, 68C of the spar member 68. The spar body 68A can include one or more passages 68P to convey a portion of the fluid F from the inner cavity 68D to the internal cavity 66D of the airfoil section 66A.

The inner cavity 68D of the spar member 68 can be dimensioned to interconnect a first plenum P1 and a second plenum P2. The first plenum P1 can be radially outward of the gas path GP, and the second plenum P2 can be radially inward of the gas path GP. The first and second plenums P1, P2 can extend generally in the circumferential direction T. The first plenum P1 can be bounded between surfaces of the case 63 and a radially outer (e.g., cold side) surface of the first platform 66B. The second plenum P2 can be radially inward of, and can be bounded by, a radially inner (e.g., cold side) surface of the second platform 66C.

The first plenum P1 and/or inner cavity 68D of the spar member 68 can be coupled to a coolant source CS (shown in dashed lines for illustrative purposes). The coolant source CS can be configured to supply or convey fluid F such as pressurized cooling flow to cool portions of the section 60 including the case 63 and each vane 66. The coolant source CS can include bleed air from an upstream stage of the compressor section 24 (FIG. 1), bypass air, or a secondary cooling system aboard the aircraft, for example. The inner cavity 68D of the spar member 68 can be dimensioned to convey the fluid F from the coolant source CS, either directly or from the first plenum P1, to the second plenum P2. The second plenum P2 can be dimensioned to convey the fluid F from the inner cavity 68D to a seal arrangement adjacent the gas path GP and/or a bearing compartment of one of the bearing systems 38 (FIG. 1), for example.

Figures 4, 6:
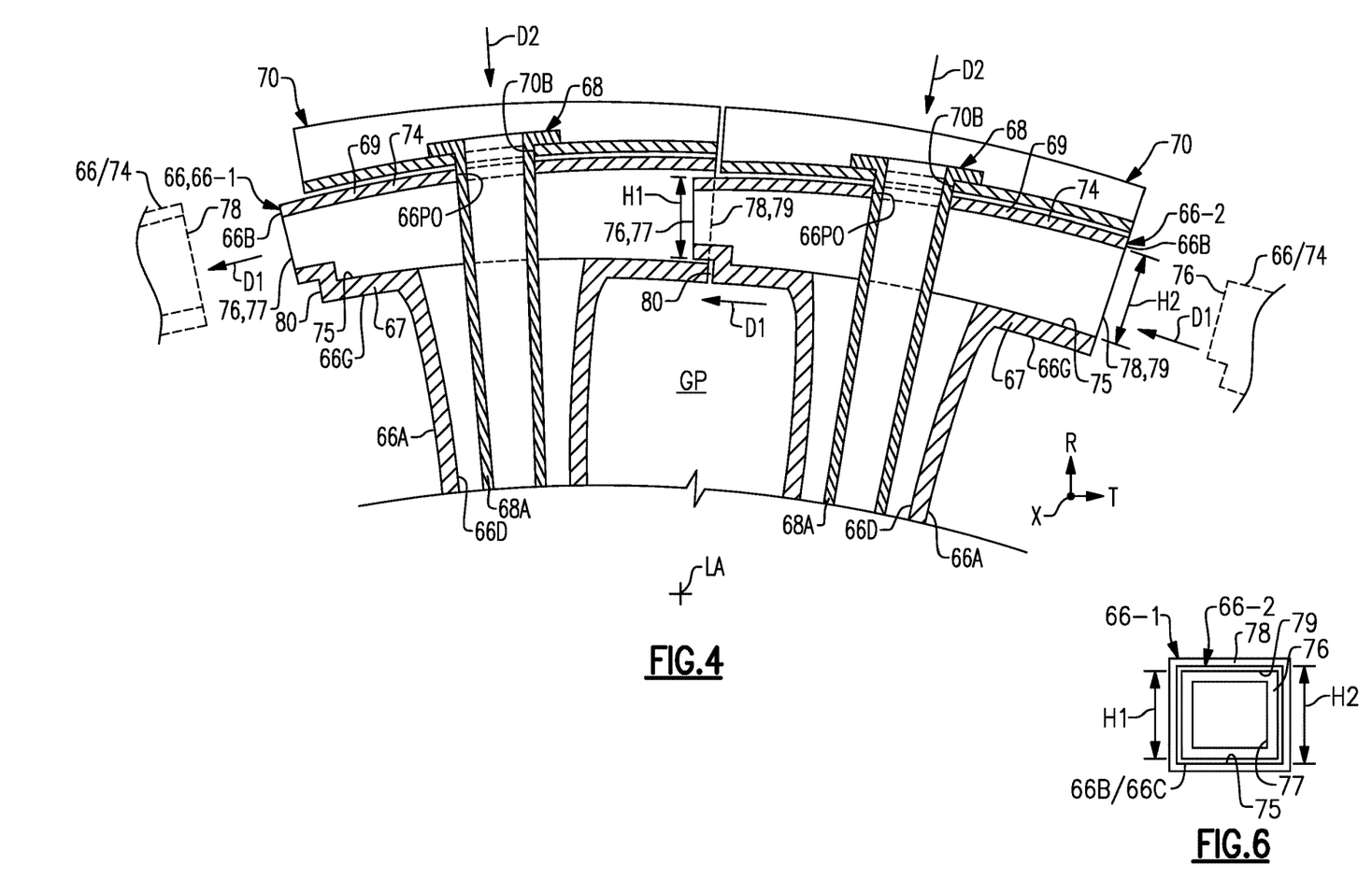
FIG. 4 illustrates an axial view of the section of FIG. 2 including adjacent vanes.
FIG. 6 illustrates adjacent platforms nested with each other.
Figure 5:
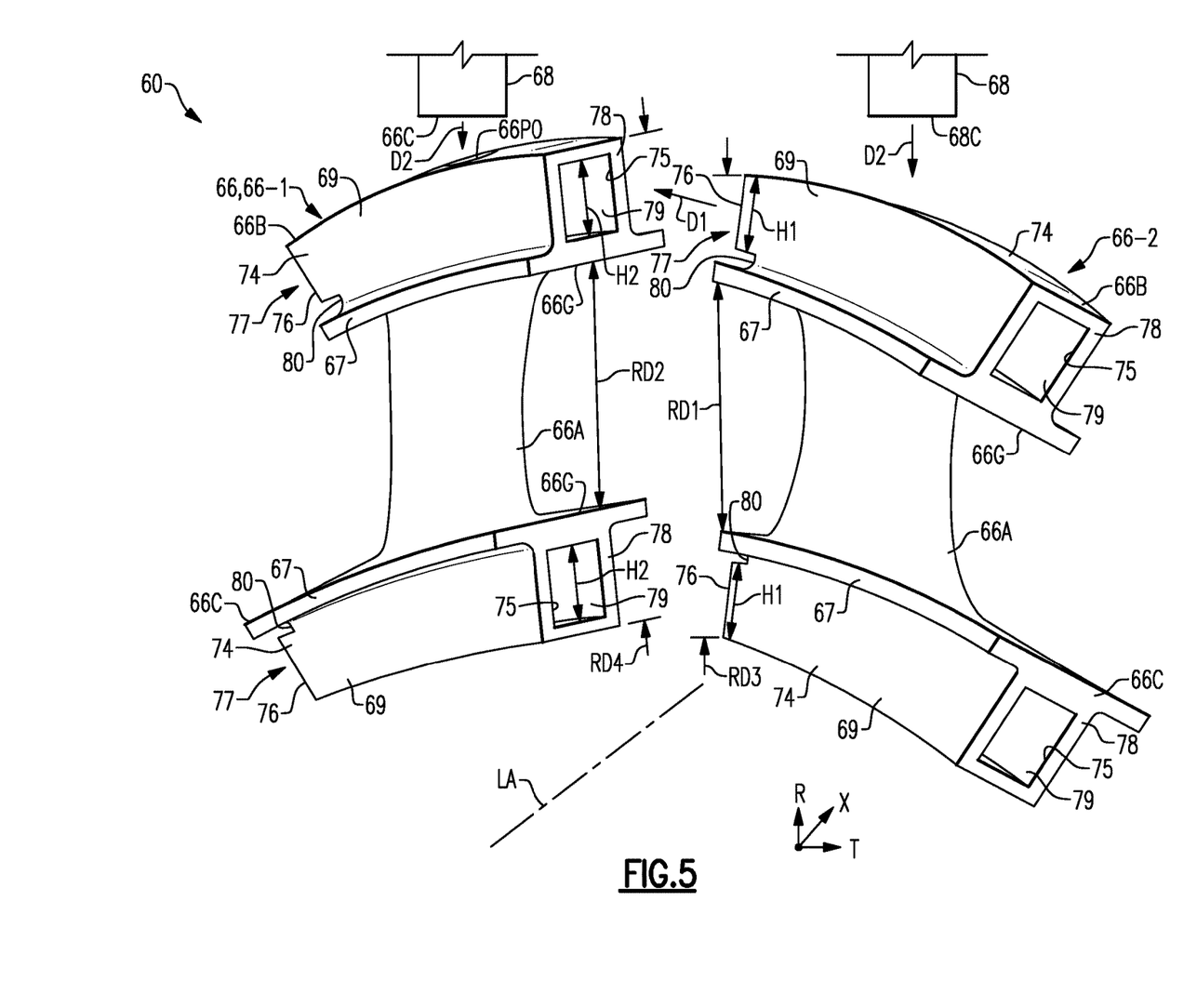
FIG. 5 illustrates an exploded view of the section of FIG. 4.

Referring to FIGS. 4-5, with continuing reference to FIGS. 2-3, a pair of adjacent vanes 66 are shown (e.g., first and second vanes 66-1, 66-2). The vanes 66 can be dimensioned to establish a nested platform arrangement or assembly. Each of the platforms 66B and 66C (FIG. 5) of the vane 66 includes a main body 74 extending circumferentially between a first mate face 76 and a second mate face 78 to establish the gas path surface 66G. The main body 74 includes a first opening 77 and a second opening 79 along the respective first and second mate faces 76, 78. The main body 74 can include an internal passage 75 extending circumferentially between the first opening 77 and second opening 79. The first mate face 76 of the platform 66B/66C of the vane 66-2 can be received through the second opening 79 of the platform 66B/66C of the adjacent vane 66-1 to establish the nested array of vanes 66.

A perimeter of the first mate face 76 is dimensioned to establish a first area, and a perimeter of the second opening 79 along the second mate face 78 establishes a second area, as illustrated by FIG. 6. The main body 74 can include a notch 80 to facilitate alignment of adjacent platforms 66B, 66C. The notch 80 can serve to reduce the first area along the first mate face 76. The first mate face 76 can be insertable into the internal passage 75 along the second mate face 78 of an adjacent platform 66B/66C to secure the vanes 66-1, 66-2 to each other. The second area can be greater than the first area such that the first mate face 76 of the vane 66-2 is insertable into the second opening 79 of the vane 66-1, as illustrated by FIGS. 4 and 6. The vane 66-2 can be moved in a first direction D1 to at least partially insert the first mate face 76 of the vane 66-2 into the opening 79 of the vane 66-1. In other implementations, the platforms 66B, 66C can be dimensioned such that the second mate face 78 of the vane 66-1 can be received through the opening 77 of the vane 66-2.

Referring to FIG. 5, with continuing reference to FIG. 4, the main body 74 of the first and second platforms 66B, 66C can be dimensioned to taper in width and/or height in the circumferential direction T between the first and second mate faces 76, 78. In implementations, each of the first and second platforms 66B, 66C can establish a first height H1 along the first mate face 76 and a second height H2 along the second opening 79 of the second mate face 78. The first and second heights H1, H2 can be the same or can differ. Each of the first and second platforms 66B, 66C can be dimensioned such that the first height H1 is less than the second height H2.

The platforms 66B, 66C can taper in the circumferential direction to establish various profiles of the gas path GP adjacent to the vanes 66. The gas path surface 66G of the first platform 66B faces the gas path surface 66G of the second platform 66C. A first distance RD1 can be established between the gas path surface 66G of the first platform 66B and the gas path surface 66G of the second platform 66C at the first mate face 76. A second distance RD2 can be established between the gas path surface 66G of the first platform 66B and the gas path surface 66G of the second platform 66C at the second mate face 78. The first and second platforms 66B, 66C can be dimensioned such that the first distance RD1 is the same or differs from the second distance RD2. The distances RD1, RD2 may differ to establish a circumferentially asymmetric gas path GP. The first distance RD1 may be less than the second distance RD2. The first distance RD1 may be established on the suction side 66S (FIG. 3) and the second distance RD2 may be established on the pressure side 66P (FIG. 3) of the airfoil section 66A, or vice versa.

A third distance RD3 can be established between radially outermost surfaces of the first platform 66B and second platform 66C at the first mate face 76. A fourth distance RD4 can be established between the radially outermost surfaces of the first platform 66B and second platform 66C at the second mate face 78. The first and second platforms 66B, 66C can be dimensioned such that the third distance RD3 is the same or differs from the fourth distance RD4. In examples, the platform(s) 66B and/or 66C can be dimensioned to taper in the circumferential direction T between the mate faces 76, 78 to establish the disclosed relationships of the distances R1-R4.

The spar members 68 can be positioned in the vanes 66 subsequent to securing the vanes 66 to each other to establish the vane array. The second end portion 68C of each spar member 68 can be moved in a second direction D2 through the opening 70B of the mount 70, then through the platform opening 66PO, and then at least partially into or through the internal cavity 66D of the airfoil section 66A, as illustrated in FIG. 4.

Various techniques can be utilized to fabricate the vanes 66. The airfoil section 66A and platforms 66B, 66C can be integrally formed or can be separate and distinct components fixedly attached to each other. Various materials can be utilized to form the vanes 66. The airfoil section 62A and/or platforms 66B, 66C can comprise metallic materials, such as a metal or high temperature metal alloy, or non-metallic materials such a ceramic material, including monolithic ceramics and ceramic matrix composites (CMC).

Figure 7A:
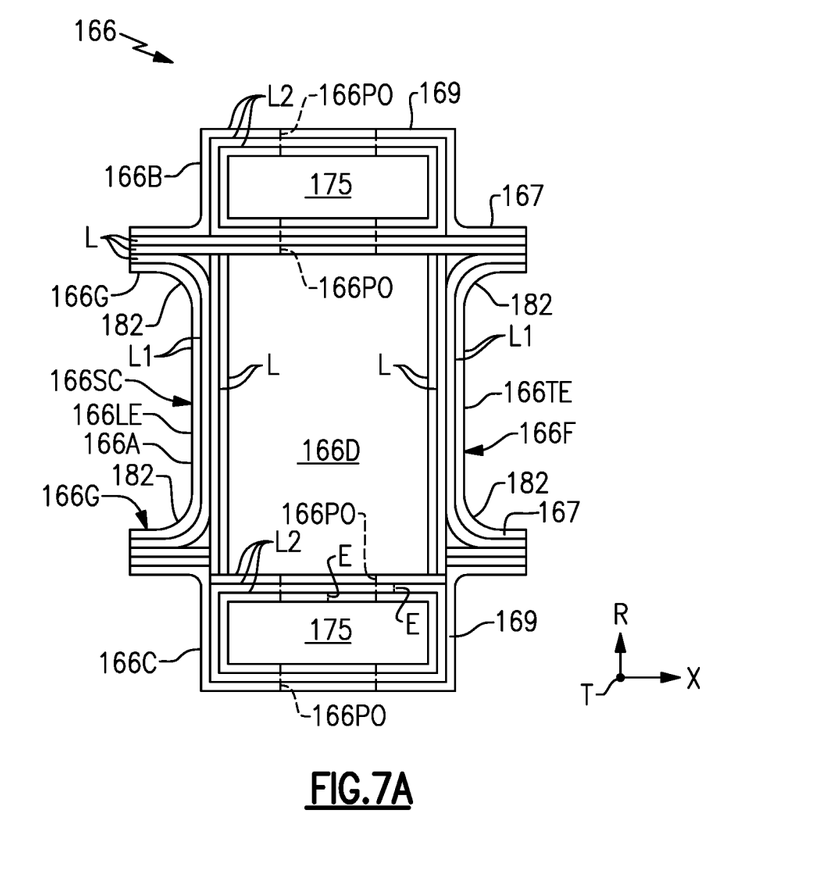
FIG. 7A illustrates an exemplary vane.

Referring to FIG. 7A, an exemplary vane 166 is disclosed. The vane 166 can be incorporated into any of the arrangements disclosed herein. In this disclosure, like reference numerals designate like elements where appropriate and reference numerals with the addition of one-hundred or multiples thereof designate modified elements that are understood to incorporate the same features and benefits of the corresponding original elements.

The vane 166 can include an airfoil section 166A extending between a first platform 166B and a second platform 166C. The airfoil section 166A establishes an external surface contour 166SC. Each platform 166B, 166C can include a sealing portion 167 and a mounting portion 169. The mounting portion 169 can extend radially outwardly from the sealing portion 167.

The airfoil section 166A can be integrally formed with the first platform 166B and/or second platform 166C. The airfoil section 166A and the platforms 166B and/or 166C can be established by a plurality of plies L comprising a CMC material. The CMC material can include continuous or discontinuous fibers in a matrix arranged in one or more layers L to establish a CMC layup. The fibers can be arranged in various orientations and configurations in a matrix material. In example, the plies L can incorporate a braided fiber or cloth. The plies L can be arranged in various orientations relative to each other in a layup to establish a predetermined geometry of the vane 166. The plies L can include a first set of plies L1 and a second set of plies L2. The first and second sets of plies L1, L2 can include one or more layers. The first set of plies L1 can establish the sealing portion 167. The second set of plies L2 can establish the mounting portion 169. The first set of plies L1 can follow a respective contour 182 joining the airfoil section 166A and the first platform 166B and/or second platform 166C to establish the external surface contour 166SC of the airfoil section 166A. The second set of plies L2 can be arranged to follow and loop about a perimeter of the internal passage 175 of the respective platform 166B/166C such that the mounting portion 169 has a generally tubular or box-shaped geometry. The second set of plies L2 can be a continuous wrap, or can be a discontinuous wrap as illustrated by ends E (shown in dashed lines in FIG. 7A for illustrative purposes). The continuous wrap may be fabricated from braided fibers and may establish the mounting portion 169, which may reduce a complexity in fabricating the vane 166. The discontinuous wrap may be fabricated from a harness satin fabric.

One or more platform openings 166PO can be formed through the plies L (shown in dashed lines for illustrative purposes). The airfoil section 166A can cooperate with the platforms 166B, 166C to establish a fairing 166F. The openings 166PO can be dimensioned to at least partially receive a respective spar member (see, e.g., FIGS. 2 and 4).

Figure 7B:
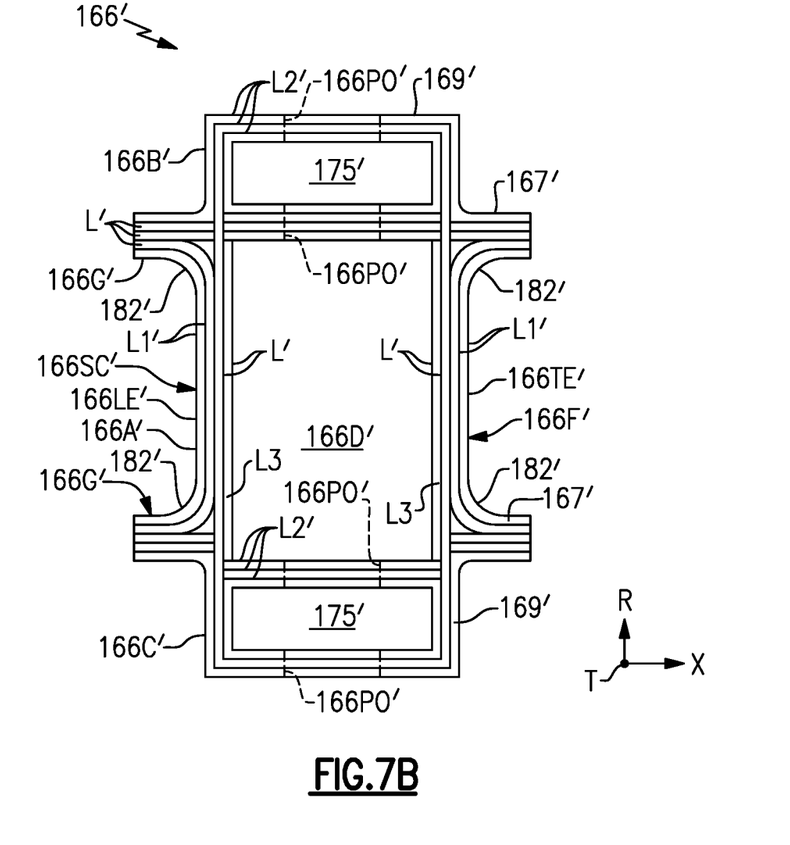
FIG. 7B illustrates another exemplary vane.

FIG. 7B illustrates another exemplary vane 166'. The vane 166' can be established by a plurality of layers L'. The layers L' can incorporate any of the materials disclosed herein. The layers L' can include first, second and/or third sets of plies L1', L2', L3'. The third set of plies L3' may be arranged to establish a thickness of the airfoil section 166A'. The third set of plies L3' may extend along the first set of plies L1' and/or the second set of plies L2'. The third set of plies L3' may extend from the airfoil section 166A', through a sealing portion 167' and into a mounting portion 169' of one or more of the platforms 166B', 166C'. The third set of plies L3' may serve to provide increased support to the mounting portions 169', which can improve durability of the vane 166'.

Figure 8:
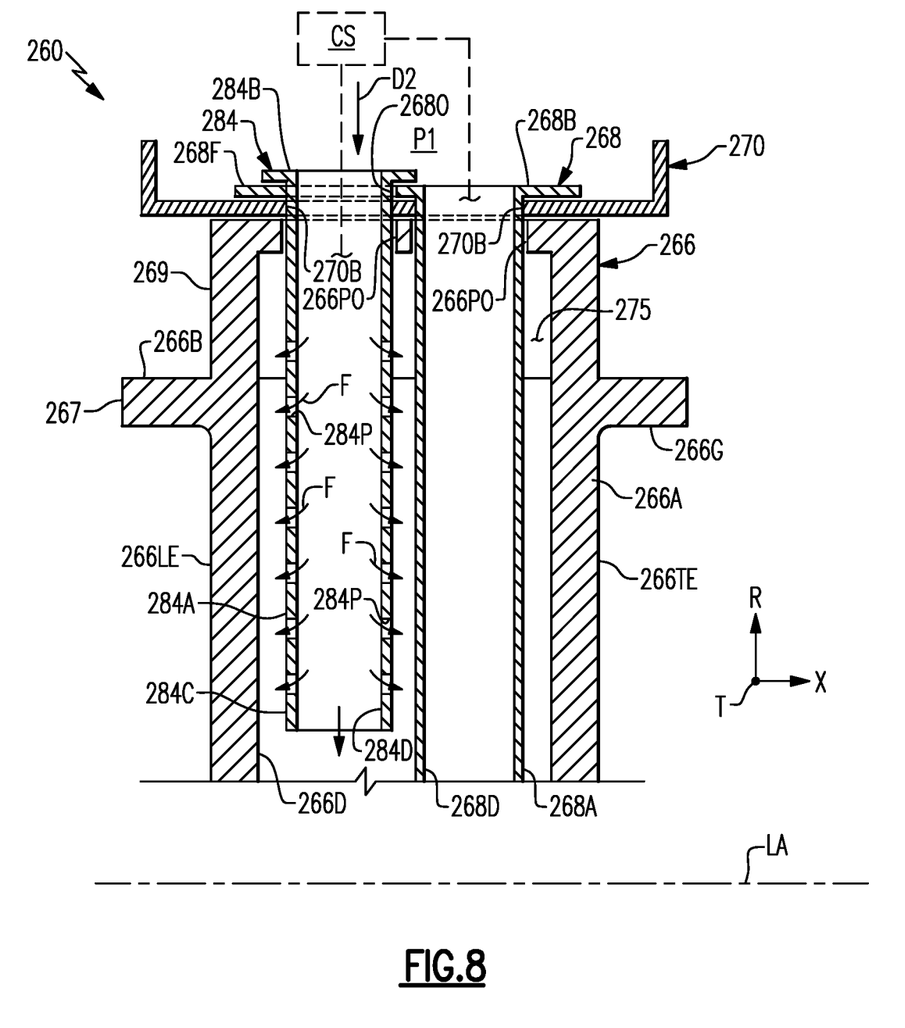
FIG. 8 illustrates another exemplary section of a gas turbine engine including a baffle.

FIG. 8 illustrates another exemplary section 260 for a gas turbine engine. The section 260 can include a vane 266 and spar member 268. The vane 266 can include an airfoil section 266A extending from a platform 266B. The spar member 268 can include a spar body 268A extending from a first end portion 268B. The spar member 268 can include a flange 268F extending outwardly from the spar body 268A at the first end portion 268B. The flange 268F can include an opening 268O dimensioned to be at least partially aligned with a respective opening 266PO of the adjacent platform 266B.

Each vane 266 and spar member 268 can be dimensioned to at least partially receive a baffle 284. Although only one baffle 284 is shown in FIG. 8 for illustrative purposes, the section 260 can include a plurality of baffles 284 received in respective vanes 266.

The baffle 284 includes a baffle body 284A extending between a first end portion 284B and a second end portion 284C. The baffle body 284A includes an inner cavity 284D dimensioned to convey fluid F such as cooling flow from a coolant source CS (shown in dashed lines for illustrative purposes). The fluid F may be conveyed from the coolant source CS or from a plenum P1 coupled to the coolant source CS. The baffle body 284A can include one or more passages 284P dimensioned to convey the fluid F from the inner cavity 284D to the internal cavity 266D of the vane 266 to provide cooling augmentation to adjacent portions of the vane 266.

Various techniques may be utilized to secure the baffle 284 to the vane 266. The baffle 284 can be moved in a direction D2 such that the second end portion 284C of the baffle 284 is inserted through the opening 268O of the flange 268F, through the opening 266PO of the adjacent platform 266B, and then into the internal cavity 266D of the airfoil section 266A.

Figure 9:
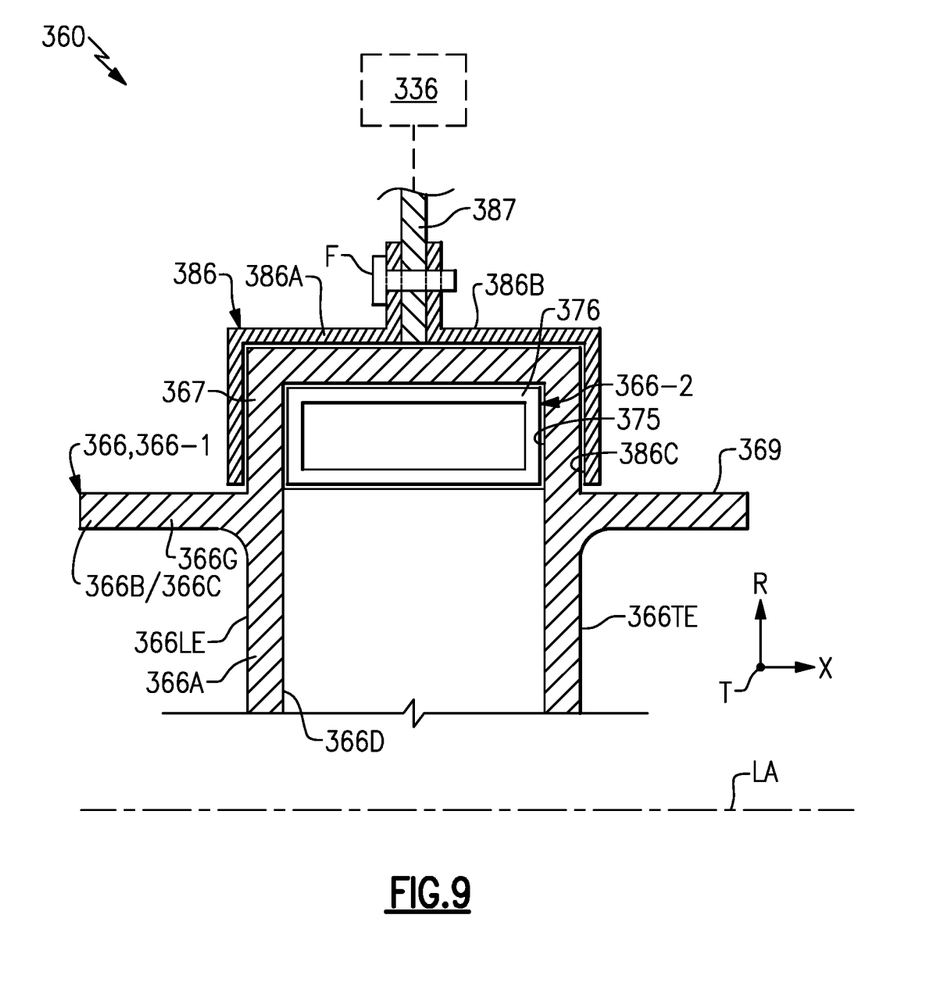
FIG. 9 illustrates another exemplary section of a gas turbine engine including a vane and a mount.

FIG. 9 illustrates another exemplary section 360 for a gas turbine engine. The section 360 includes at least one vane 366. In the illustrative example of FIG. 9, a spar member is omitted. The section 360 can include a plurality of vanes 366 in a nested arrangement to establish an array (illustrated by vanes 366-1, 366-2).

The section 360 can include a mount 386 that secures the vane 366 to a flange 387 or another portion of an engine static structure 336. The mount 386 can include a first mount portion 386A and a second mount portion 386B axially opposed to the first mount portion 386A. The second mount portion 386B can be fixedly attached to the first mount portion 386A to establish an annular channel 386C. The first and second mount portions 386A, 386B can be fixedly attached or otherwise secured to the flange 387 with one or more fasteners F.

The first and second mount portions 386A, 386B can extend about an assembly axis LA and can cooperate to establish a generally C-shaped annular hoop or ring to define the annular channel 386C. The annular channel 386C can be dimensioned to capture or trap a mounting portion 369 of an adjacent platform 366B/366C of one or more of the vanes 366 to secure each vane 366 to the engine static structure 336. Each platform 366B/366C can be secured to the engine static structure 336 with a respective mount 386. The annular channel 386C can be dimensioned to permit a limited amount of radial and/or axial movement of the captured platform 366B/366C during engine operation.

Figure 10:
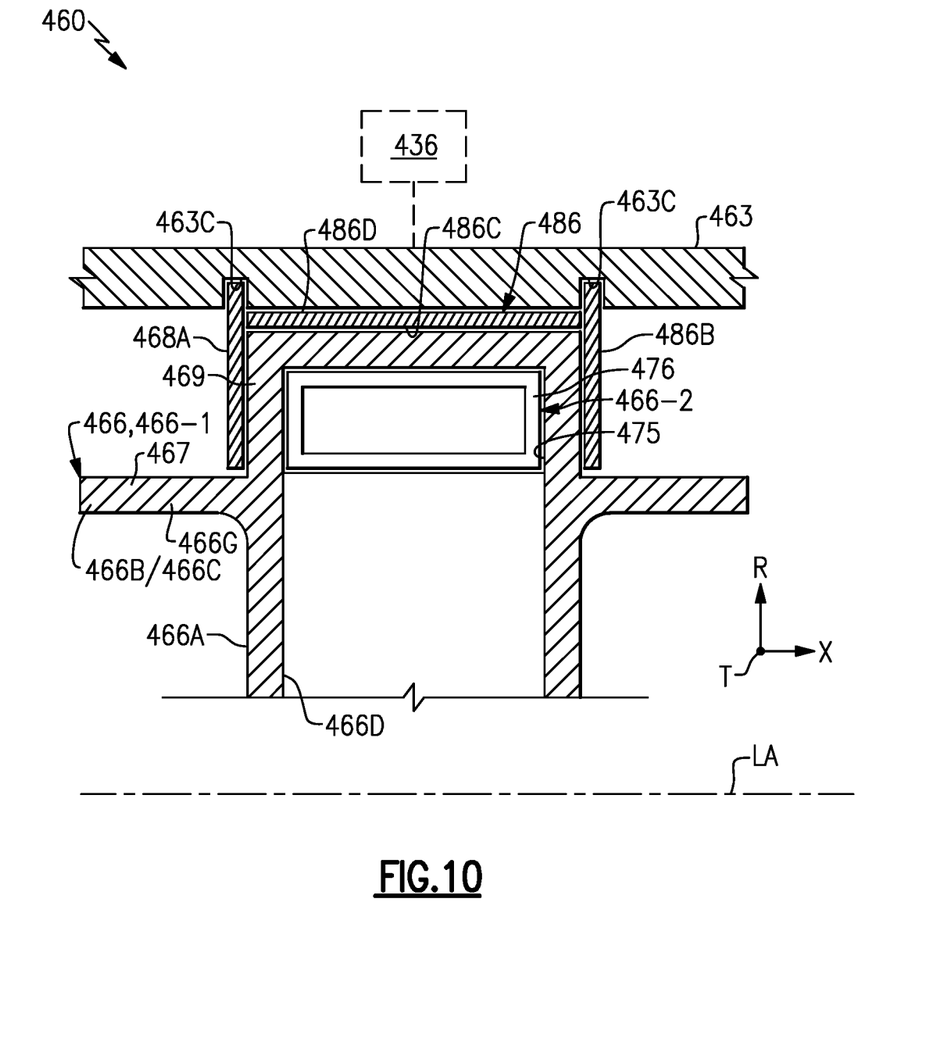
FIG. 10 illustrates yet another exemplary section of a gas turbine engine including a vane and a mount.

FIG. 10 illustrates another exemplary section 460 for a gas turbine engine. The section 460 includes at least one vane 466. In the illustrative example of FIG. 10, a spar member is omitted. The section 460 can include a plurality of vanes 466 in a nested arrangement to establish an array (illustrated by vanes 466-1, 466-2).

The section 460 can include a mount 486 that secures the vane 466 to a housing (or case) 463 or another portion of an engine static structure 436. The mount 486 can include a first mount portion 486A, a second mount portion 486B and a third mount portion 486D. The mount portions 486A, 486B, 486D can extend about an assembly axis LA and can include one or more segments. The third mount portion 486D can be dimensioned in the shape of an annular hoop or ring. The first, second and third mount portions 486A, 486B, 486D can be arranged to establish an annular channel 486C. The annular channel 486C can be dimensioned to capture or trap a mounting portion 469 of an adjacent platform 466B/466C to secure each vane 466 to the engine static structure 436. The first and second mount portions 486A, 486B can be received in respective channels 463C in the housing 463 to limit movement of the third mount portion 486C and adjacent platform 466B/466C.

Other techniques may be utilized to secure the vanes. Exemplary techniques can secure the platforms with mounting blocks at least partially received in an internal passage of the respective platform.

The nested platform arrangements and techniques disclosed herein may be utilized to improve sealing between adjacent platforms, which may reduce cooling augmentation demands and improve engine efficiency. The nested platform arrangements may improve positioning of the vanes and reduce stress concentrations in CMC-based applications. The disclosed techniques may also reduce complexity of fabricating the components, including one or more machining operations.

It should be understood that relative positional terms such as "forward," "aft," "upper," "lower," "above," "below," and the like are with reference to the normal operational attitude of the vehicle and should not be considered otherwise limiting.

Although the different examples have the specific components shown in the illustrations, embodiments of this disclosure are not limited to those particular combinations. It is possible to use some of the components or features from one of the examples in combination with features or components from another one of the examples.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. An assembly for a gas turbine engine comprising:
at least one platform including a main body extending between a first mate face and a second mate face to establish a gas path surface, the main body including an internal passage extending circumferentially between a first opening along the first mate face and a second opening along the second mate face relative to an assembly axis, wherein a perimeter of the first mate face establishes a first area, a perimeter of the second opening establishes a second area, and the second area is greater than the first area;

an airfoil section extending radially from the at least one platform relative to the assembly axis, the airfoil section including an internal cavity extending at least partially from the at least one platform;

wherein the airfoil section is integrally formed with the at least one platform, the airfoil section establishes an external surface contour, and the airfoil section and the platform are established by a plurality of plies comprising a ceramic matrix composite (CMC) material, and the at least one platform and the airfoil section cooperate to establish a fairing;

a spar member including a spar body extending between a first end portion and a second end portion, wherein the second end portion of the spar body is insertable at least partially through an opening of the at least one platform and into the internal cavity of the airfoil section, and the first end portion of the spar member is attachable to a static structure; and a baffle including a baffle body extending between a first end portion and a second end portion, the baffle body including an inner cavity dimensioned to convey cooling flow from a coolant source; and wherein the spar member includes a flange extending outwardly from the spar body at the first end portion, and the flange includes an opening at least partially aligned with an opening of the at least one platform, and wherein the second end portion of the baffle is insertable through the opening of the flange, through the opening of the at least one platform and into the internal cavity of the airfoil section.

2. The assembly as recited in claim 1, wherein the at least one platform includes a first platform, and the airfoil section extends radially inward from the first platform relative to the assembly axis.

3. The assembly as recited in claim 2, wherein the at least one platform includes a second platform, and the airfoil section extends radially outward from the second platform to the first platform relative to the assembly axis.

4. The assembly as recited in claim 3, wherein the gas path surface of the first platform faces the gas path surface of the second platform, a first distance is established between the gas path surface of the first platform and the gas path surface of the second platform at the first mate face, a second distance is established between the gas path surface of the first platform and the gas path surface of the second platform at the second mate face, and the first and second platforms are dimensioned such that the first distance differs from the second distance.

5. The assembly as recited in claim 1, wherein the plurality of plies include a first set of plies that follow a contour joining the at least one platform and the airfoil section.

6. The assembly as recited in claim 5, wherein:
the plurality of plies include a second set of plies that follow a perimeter of the internal passage.

7. The assembly as recited in claim 1, wherein the first mate face is insertable into an internal passage along a second mate face of an adjacent platform.

8. The assembly as recited in claim 1, wherein the at least one platform includes a first platform and a second platform radially opposed to the first platform relative to the assembly axis, and the airfoil section extends radially between the first and second platforms relative to the assembly axis to interconnect the first and second platforms.

9. The assembly as recited in claim 1, wherein:
the baffle body includes a plurality of passages distributed between the first and second end portions, and the plurality of passages are dimensioned to convey cooling flow from the inner cavity towards surfaces bounding the internal cavity of the airfoil section.

10. The assembly as recited in claim 9, wherein:
the plurality of passages are dimensioned to convey cooling flow from the inner cavity towards surfaces of the spar body.

11. An assembly for a gas turbine engine comprising:
at least one platform including a main body extending between a first mate face and a second mate face to establish a gas path surface, the main body including an internal passage extending circumferentially between a first opening along the first mate face and a second opening along the second mate face relative to an assembly axis, wherein a perimeter of the first mate face establishes a first area, a perimeter of the second opening establishes a second area, and the second area is greater than the first area;

an airfoil section extending radially from the at least one platform relative to the assembly axis, the airfoil section including an internal cavity extending at least partially from the at least one platform; and wherein the airfoil section is integrally formed with the at least one platform, the airfoil section establishes an external surface contour, and the airfoil section and the platform are established by a plurality of plies comprising a ceramic matrix composite (CMC) material;

wherein the plurality of plies include a first set of plies that follow a contour joining the at least one platform and the airfoil section;

wherein the plurality of plies include a second set of plies that follow a perimeter of the internal passage; and wherein the plurality of plies include a third set of plies that extend from the airfoil section, through a sealing portion of the at least one platform, and into a mounting portion of the at least one platform.

12. The assembly as recited in claim 11, wherein:
the at least one platform includes a first platform and a second platform, and the airfoil section extends radially outward from the second platform to the first platform relative to the assembly axis.

13. The assembly as recited in claim 12, wherein:
the gas path surface of the first platform faces the gas path surface of the second platform, a first distance is established between the gas path surface of the first platform and the gas path surface of the second platform at the first mate face, a second distance is established between the gas path surface of the first platform and the gas path surface of the second platform at the second mate face, and the first and second platforms are dimensioned such that the first distance differs from the second distance.

14. An assembly for a gas turbine engine comprising:
a plurality of vanes including a first vane and a second vane secured to the first vane;
wherein each of the vanes comprises:
a first platform and a second platform radially opposed to the first platform;
an airfoil section extending radially to join the first and second platforms, the airfoil section comprising a ceramic material; and wherein each of the first and second platforms includes a main body extending circumferentially between a first mate face and a second mate face, the main body includes first and second openings along the respective first and second mate faces; and wherein the first mate face of the first vane is received through the second opening of the second vane;

a plurality of spar members, each of the spar members including a spar body extending between a first end portion and a second end portion, wherein the second end portion of the spar body is at least partially insertable through an opening of the first platform and an internal cavity of the airfoil section of the respective vane, and the first end portion of the spar member is attachable to a static structure to mount the respective vane;

a plurality of baffles, each of the baffles including a baffle body extending between a first end portion and a second end portion, the baffle body including an inner cavity dimensioned to convey cooling flow from a coolant source, wherein each of the spar members includes a flange extending outwardly from the spar body at the first end portion, and the flange includes an opening at least partially aligned with the opening of the first platform of the respective vane, and the second end portion of the baffle is insertable through the opening of the flange, through the opening of the first platform and into the internal cavity of the airfoil section of the respective vane.

15. The assembly as recited in claim 14, wherein the airfoil section is integrally formed with the first and second platforms, and the airfoil section and the first and second platforms are established by a plurality of plies comprising a ceramic matrix composite (CMC) material.

16. The assembly as recited in claim 15, wherein:
the plurality of plies include a first set of plies that follow a contour joining the airfoil section with the first and second platforms.

17. A gas turbine engine comprising:
a compressor section including a compressor;
a turbine section including a turbine coupled to the compressor;
wherein at least one of the compressor and turbine sections includes an array of blades rotatable about a longitudinal axis and an array of vanes adjacent to the array of blades; and
wherein each vane of the array of vanes comprises:
a first platform and a second platform having gas path surfaces radially opposed relative to the longitudinal axis to bound a gas path;
an airfoil section extending radially to join the first and second platforms, the airfoil section comprising a ceramic material;
wherein each of the first and second platforms includes a main body extending circumferentially between a first mate face and a second mate face to establish the respective gas path surfaces, the main body includes an internal passage extending circumferentially between first and second openings along the respective first and second mate faces;
wherein the first mate face of the first platform is insertable into the second opening along the second mate face of the first platform of an adjacent one of the vanes to establish the array of vanes; and
wherein the airfoil section is integrally formed with the first and second platforms, the airfoil body and the first and second platforms are established by a plurality of plies comprising a ceramic matrix composite (CMC) material, the plurality of plies include a first set of plies and a second set of plies, the first set of plies follow a contour joining the first platform and the airfoil section, and the second set of plies follow a perimeter of the internal passage of the first platform.

18. The gas turbine engine as recited in claim 17, wherein the first and second platforms and the airfoil section cooperate to establish a fairing, and further comprising:
a plurality of spar members, each of the spar members including a spar body extending between a first end portion and a second end portion; and
wherein the second end portion of the spar body is insertable at least partially through an opening of the first platform of a respective one of the vanes and into an internal cavity of the respective airfoil section; and
the first end portion of the spar member is attachable to an engine static structure to secure the respective vane.

19. The gas turbine engine as recited in claim 17, wherein each of the first and second platforms establishes a first height along the first mate face and establishes a second height along the second opening of the second mate face, and each of the first and second platforms is dimensioned such that the first height is less than the second height.

20. The gas turbine engine as recited in claim 17, further comprising:
a mount including a first mount portion and a second mount portion fixedly attached to the first mount portion to establish an annular channel; and
wherein the annular channel is dimensioned to capture the first platform of each of the vanes to secure the vanes to an engine static structure.

* * * * *